US012581215B2

(12) United States Patent
Colodro Conde

(10) Patent No.: US 12,581,215 B2
(45) Date of Patent: Mar. 17, 2026

(54) DARK CURRENT PATTERN ESTIMATION METHOD

(71) Applicant: INSTITUTO DE ASTROFÍSICA DE CANARIAS, Santa Cruz de Tenerife (ES)

(72) Inventor: Carlos Colodro Conde, Santa Cruz de Tenerife (ES)

(73) Assignee: INSTITUTO DE ASTROFÍSICA DE CANARIAS, Santa Cruz de Tenerife (ES)

( * ) Notice: Subject to any disclaimer, the term of this patent is extended or adjusted under 35 U.S.C. 154(b) by 169 days.

(21) Appl. No.: 18/577,038

(22) PCT Filed: Jul. 7, 2021

(86) PCT No.: PCT/ES2021/070494
§ 371 (c)(1),
(2) Date: Aug. 12, 2024

(87) PCT Pub. No.: WO2023/281129
PCT Pub. Date: Jan. 12, 2023

(65) Prior Publication Data
US 2024/0314463 A1 Sep. 19, 2024

(51) Int. Cl.
*H04N 25/63* (2023.01)
*H04N 17/00* (2006.01)

(52) U.S. Cl.
CPC ........... *H04N 25/63* (2023.01); *H04N 17/002* (2013.01)

(58) Field of Classification Search
CPC ...... H04N 25/63; H04N 17/002; H04N 23/20; H04N 25/671
See application file for complete search history.

(56) References Cited

U.S. PATENT DOCUMENTS

2008/0031537 A1* 2/2008 Gutkowicz-Krusin ..................... H04N 25/677
382/254
2020/0202569 A1 6/2020 Sandsten et al.
(Continued)

FOREIGN PATENT DOCUMENTS

EP 2618560 A1 7/2013
JP 2004-328744 A 11/2004
(Continued)

OTHER PUBLICATIONS

Chengwei Liu, "Shutterless non-uniformity correction for teh long-term stability of an uncooled long-wave infrared camera", Journal, 2018, 1-7, vol. 29, Measurement Science and Technology.
(Continued)

*Primary Examiner* — Michael Lee
(74) *Attorney, Agent, or Firm* — Hayes Soloway, PC

(57) ABSTRACT

A dark current pattern estimation method of a 2D sensor for a shutterless uncooled camera is provided. The 2D sensor includes a matrix of pixels (x, y). The dark current pattern is divided into rate and offset. The method includes the steps of setting a new temperature, waiting for the new temperature to stabilize, acquiring averaged images at at least two $t_{exp}$, alternatively and continuously, obtaining from each averaged image a dark current offset and a dark current rate for each pixel, interpolating the dark current offsets obtained for each pixel, interpolating the dark current rate obtained for each pixel, and obtaining the dark current pattern in terms of temperature, exposure time and pixel position.

5 Claims, 16 Drawing Sheets

(56) References Cited

U.S. PATENT DOCUMENTS

| | | | | |
|---|---|---|---|---|
| 2021/0275126 A1* | 9/2021 | Oda | .................... | A61B 6/5258 |
| 2022/0385842 A1* | 12/2022 | Price | .................... | H04N 25/46 |

FOREIGN PATENT DOCUMENTS

| | | |
|---|---|---|
| JP | 2010-210810 A | 9/2010 |
| JP | 2013-118563 A | 6/2013 |
| JP | 2016-116166 A | 6/2016 |

OTHER PUBLICATIONS

"InGaAs Linear Image Sensor," Technical Document, Hamamatsu Photonics K.K., Japan, May 2021.

* cited by examiner

| Gain | $t_{exp}\#1$ | $t_{exp}\#2$ |
|---|---|---|
| 0 (high) | 600µ | 6ms |
| 1 (mid) | 2ms | 20ms |
| 2 (low) | 20ms | 200ms |

FIG. 9

| Constant | Fitted value |
|---|---|
| $A$ | $1.184179 \cdot 10^{16} ADU/s$ |
| $E_a$ | $0.733328\,eV$ |
| $C$ | $-2235.53\,ADU$ |

FIG. 10

| Step | Disk usage | Error (train) | Error (test) |
|---|---|---|---|
| 1 | 500 MiB | 0.0 | 0.991436 |
| 10 | 50 MiB | 0.031856 | 0.855056 |
| 20 | 25 MiB | 0.067516 | 1.030377 |
| 40 | 12.5 MiB | 10.222547 | 0.566391 |

FIG. 11

| Interpolation type | Error |
|---|---|
| Linear | 6.496061 |
| Quadratic | 1.083545 |
| Cubic | 1.030377 |

FIG. 12

2D Sensor

DARK CURRENT PATTERN ESTIMATION METHOD

CROSS-REFERENCE TO RELATED APPLICATIONS AND PRIORITY

This patent application claims priority from PCT Application No. PCT/ES2021/070494 filed Jul. 7, 2021.

OBJECT OF THE INVENTION

The invention consists of method that estimates a dark current pattern for each pixel of a 2D sensor of a shutterless uncooled camera using images previously obtained in a laboratory.

BACKGROUND OF THE INVENTION

Dark current is the relatively small electric current that flows through photosensitive devices, such as photomultiplier tubes, photodiodes, or charge-coupled devices, even when no photons are entering the device. It consists of the charges generated in the detector when no outside radiation is entering it. Physically, dark current is due to the random generation of electrons and holes within the depletion region of the device.

Some 2-D imaging sensors like the ones based on InGaAs (Indium Gallium Arsenide) or microbolometers have high dark current rates that change from pixel to pixel, which means that every acquired image needs to be corrected by subtracting a proper dark current pattern.

The dark current pattern depends strongly on the sensor temperature and also on the selected exposure time. In some applications these variables cannot be fixed, so the typical solution is to take a dark reference image (shutter closed) just before the image of interest (shutter opened). Several images of interest can use the same dark reference image if temperature stays constant.

There are however applications where taking a proper dark reference frame is not possible. One example is video acquisition (shutter remains always open) with no temperature control. Another example is single image acquisition with no temperature control and no mechanical shutter.

There are methods available in the literature that try to estimate the dark current as well, but they are considered not very robust and generic because they try to fit the data measured in laboratory with an equation that is supposed to model the dependence between dark current and temperature.

DESCRIPTION OF THE INVENTION

The object of the present invention is a dark current pattern estimation method, of 2D sensors (10) for shutterless uncooled cameras, that solves the problem of shutterless uncooled acquisition by estimating the dark current pattern for each image of interest based on information previously obtained in laboratory.

To do so, firstly every pixel of the 2D sensor (10) is characterized independently as a function of exposure time and temperature, and then a pseudo-empirical model based on regressions and interpolations is defined, with an eye on an efficient implementation on an embedded device.

The proposed method is useful in applications that use sensors with high dark current rates (e.g., InGaAs (Indium Gallium Arsenide)), in situations where the temperature cannot be controlled (e.g., tight power budgets) and there is no mechanical shutter available.

Going into detail on the method, a first step (11) consists on characterizing each pixel of the 2D sensor (10) independently, as a function of FPA (Focal Plane Array) temperature and exposure time ($t_{exp}$). The objective is to be able to estimate a dark current pattern for any temperature and exposure time combination, without the need of performing further on-site measurements.

The dark current pattern can be divided into two terms: the rate (ADU/s) and the offset (ADU), standing ADU for Analog to Digital Units. The offset would be the dark current pattern at $t_{exp}=0$, and the rate models the linear dependency with $t_{exp}$. Being a non-uniform pattern, a different dark current rate and offset needs to be assigned to each pixel (23). In addition, this pattern has a strong (exponential) dependency with temperature.

In most sensors nowadays, the dark current pattern is highly linear for a wide range of $t_{exp}$ values. Consequently, it is possible to perform a linear fit of the dark current pattern as a function of $t_{exp}$:

$$\text{pattern}(T, x, y) = \text{rate}(T, x, y) \cdot t_{exp} + \text{offset}(T, x, y) \tag{1}$$

where T is the FPA temperature (K), and (x, y) are the pixel coordinates.

Performing this fit for a set of FPA temperatures would enable studying the dependency of the dark current pattern and offset with temperature.

Ideally, the first step (11) of characterizing each pixel comprises the sub-steps of:

setting a new temperature (20), waiting for the temperature to stabilize (21), acquiring averaged images with various $t_{exp}$ (22), and repeating so as to get samples throughout the whole temperature range of interest (24).

It is mandatory to acquire averaged images instead of single images so as to minimize the effect of temporal noise (i.e., acquire $N_{avg}$ images and merge them into a single image by averaging each pixel coordinate). The sources of temporal noise are the readout noise and the dark noise. The latter one increases dramatically with temperature.

Unfortunately, the sub-steps above take a lot of time in practice. Alternatively, the first step of the method comprises the following simplified set of sub-steps:

starting a slow temperature ramp, in such a way that if one acquires two consecutive averaged images, they have approximately the same temperature (the slowest the ramp is, the more accurate the method will be), acquiring averaged images at at least two $t_{exp}$ (22), alternatively and continuously (note that averaging more samples means more accuracy if the temperature remains approximately constant between consecutive samples).

Preferably, in order to choose the at least two reference $t_{exp}$ values a criterion is:

making sure that the $t_{exp}$ values are in the linear zone of the sensor under study (for example, a zone with <1% deviation from linearity) (note that $t_{exp}=0$ is out of the linear zone in many sensors), choosing relatively short $t_{exp}$ values to minimize the variation of the temperature during the acquisitions corresponding to the same temperature sample (the actual limits will depend on the sensor under study and the chosen number of averaged image samples), and not taking the two $t_{exp}$ values too close to each other, as that would result in a bad fit if the SNR (signal/noise ratio) of the averaged images is low for the selected configuration (2× margin should be enough in most cases, but the method was tested with 10× margin so as to obtain more accuracy).

A second step (12) of the method would be defining a pseudo-empiric model based on regressions an interpolation. The proposal is not to try to fit dark current rate and offset versus temperature, but store a subset samples (e.g., take one sample every "step" samples) and get the desired values by means of spline interpolation, which is a form of interpolation where the interpolant is a special type of piecewise polynomial called spline. That is, instead of fitting a single, high degree polynomial to all of the values at once, spline interpolation fits low-degree polynomials to small subsets of the values.

The second step comprises the sub-steps of:

interpolating the dark current offsets obtained for each pixel (30), interpolating the dark current rate obtained for each pixel (31), and obtaining the dark current pattern (13) following equation (32):

$$\text{pattern}(T, x, y) = \text{rate}(T, x, y) \cdot t_{exp} + \text{offset}(T, x, y)$$

where T is the FPA temperature (K), and (x, y) are the pixel coordinates.

The spline interpolation can be used using linear, quadratic or cubic (1st, 2nd and 3rd order) interpolation with natural boundary conditions.

The error with linear interpolation is significantly higher than the rest of methods. The cubic method is considerably more complex to implement and calculate, but the error does not become not significantly lower. As a consequence, the quadratic method would be the preferred option for an embedded system as it obtains a good compromise. For a regular computer, the cubic method might be preferable.

In contrast to other methods of the state of the art, the present one is considered more robust and generic because it does not require any assumption or manual tuning about the dependence of dark current with temperature. This means that it is more easily applicable to other sensor models and technologies.

DESCRIPTION OF THE DRAWINGS

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented:

FIG. 9.—Shows the configuration for image acquisition in the first step of the method.

FIG. 10.—Shows the fitted constants of Arrhenius equation.

FIG. 11.—Shows the estimation error versus step size.

Figures 12, 13:
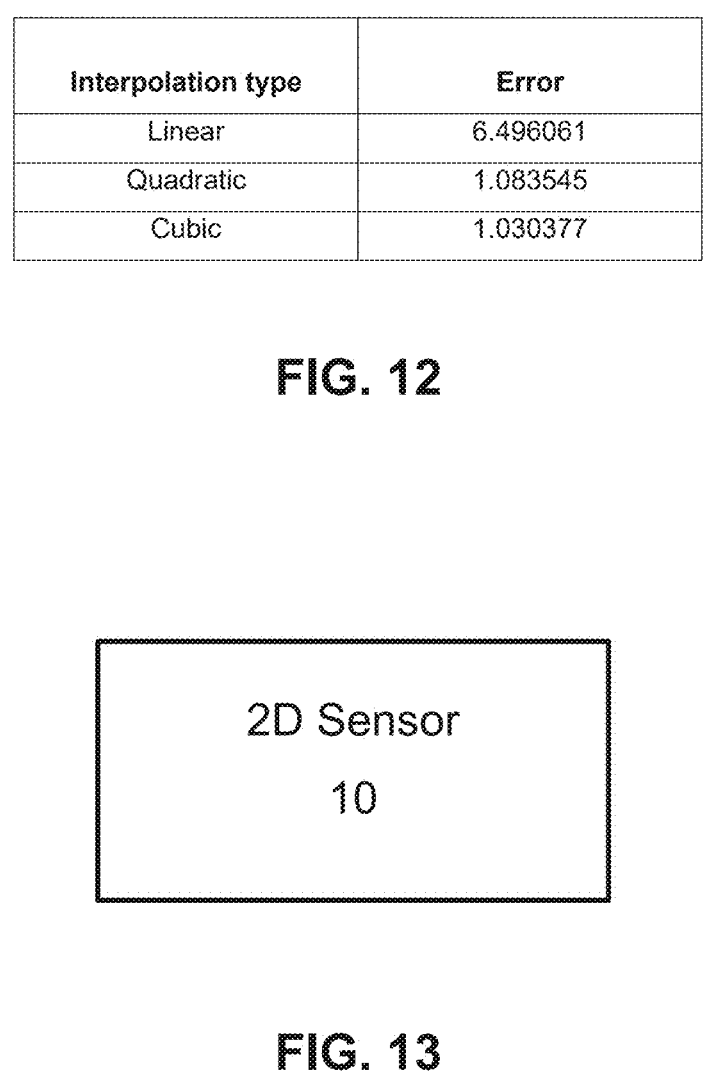

FIG. 12.—Shows the estimation error versus interpolation type.

FIG. 13.—Shows a 2D sensor.

PREFERRED EMBODIMENT OF THE INVENTION

It is described below, with help of FIGS. 1 to 16, a preferred embodiment of the dark current pattern estimation method. The method uses a 2-D sensor (10), as shown in FIG. 13, which comprises a matrix of pixels (x, y) for a shutterless uncooled camera.

Figure 14:
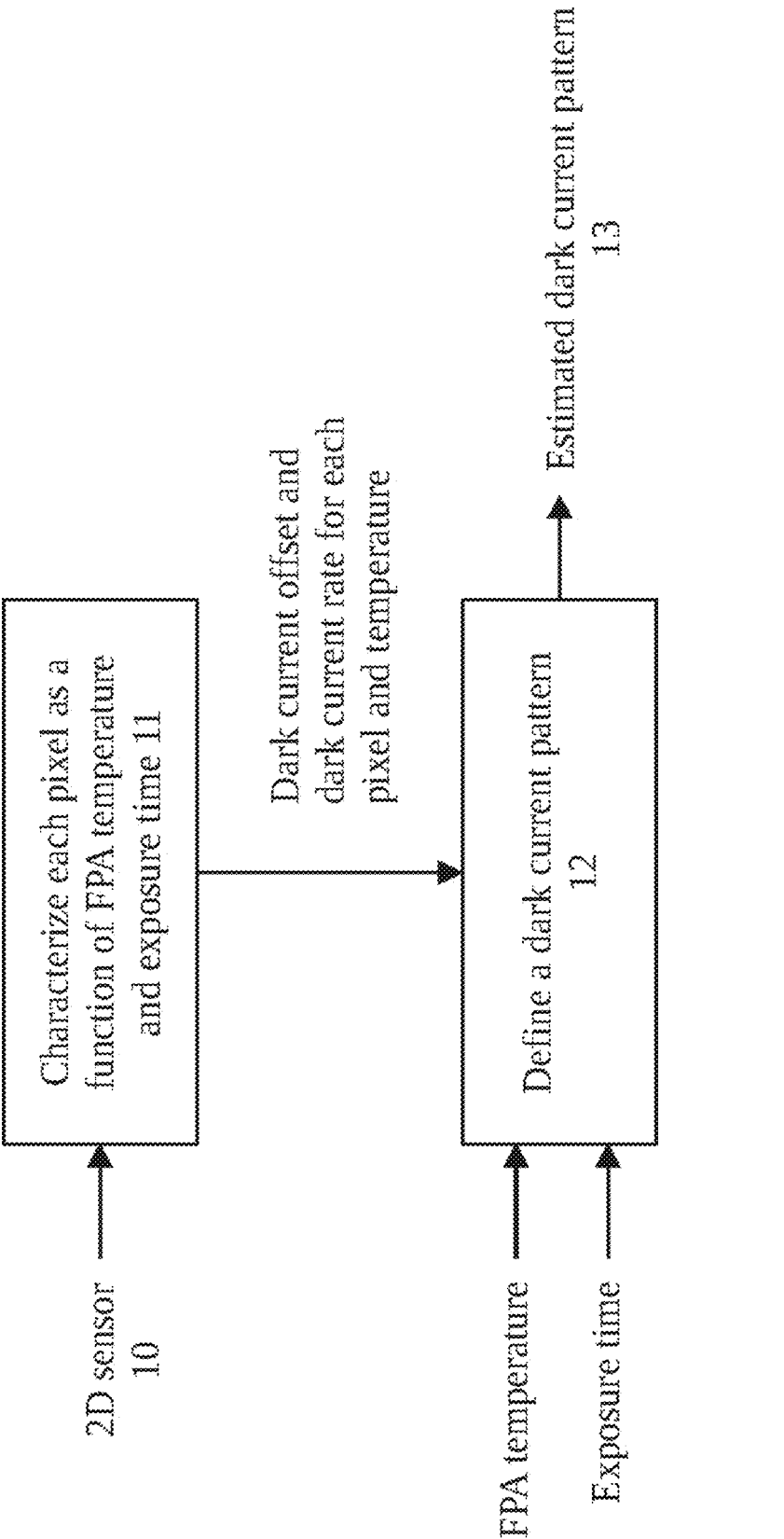
FIG. 14.—Shows the steps of the proposed dark current pattern estimation method.

As shown in FIG. 14, a first step (11) of the method consists on characterizing each pixel of the 2D sensor (10) independently, as a function of FPA (Focal Plane Array) temperature and exposure time ($t_{exp}$).

The dark current pattern can be divided into two terms: the rate (ADU/s) and the offset (ADU). The offset is be the dark current pattern at $t_{exp}$=0, and the rate models the linear dependency with $t_{exp}$. A different dark current rate and offset needs to be assigned to each pixel, as shown in sub-step (23) in FIG. 15. In addition, this pattern has a strong (exponential) dependency with temperature.

To better demonstrate the present method, a specific 2D sensor (10) has been tested.

The dark current pattern is highly linear for a wide range of $t_{exp}$ values. Consequently, it is possible to perform a linear fit of the dark current pattern as a function of $t_{exp}$:

$$\text{pattern}(T, x, y) = \text{rate}(T, x, y) \cdot t_{exp} + \text{offset}(T, x, y) \qquad (1)$$

where T is the FPA temperature (K), and (x, y) are the pixel coordinates.

Figure 15:
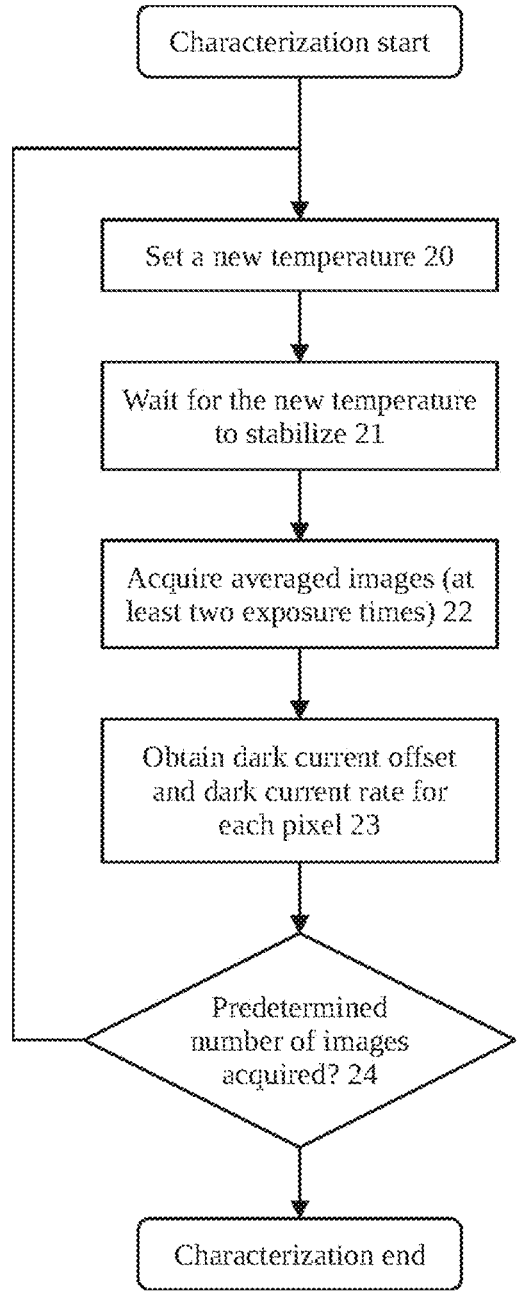
FIG. 15.—Shows the sub-steps of the characterization step of the proposed method.

As shown in FIG. 15, ideally, the first step (11) of characterizing each pixel comprises the sub-steps of:

setting a new temperature (20), wait for the temperature to stabilize (21), acquiring averaged images with various $t_{exp}$ (22), and repeating if necessary (24).

Unfortunately, the sub-steps above take a lot of time in practice. Alternatively, the first step of the method comprises the following simplified set of sub-steps:

starting a slow temperature ramp, acquiring averaged images at at least two $t_{exp}$ (22), alternatively and continuously.

In the test, the ambient temperature ramp was configured to vary from 0° C. to 50° C. in around 2.5 hours. For each studied gain, 200 pairs of averaged images where acquired, each pair corresponding to one temperature sample.

FIG. 9 shows the configuration that was decided for the test, based on previous measurements about linearity for this sensor. During the tests, gain 2 was actually skipped, as acquiring 200 images at $t_{exp}$=200 ms would take at least 40 seconds, and the temperature could vary significantly during this period.

Given that all gain configurations were acquired alternatively during the same test, discarding gain 2 resulted in more samples for gain 0 and 1, as these ones were more interesting for the application under study.

In order to be able to predict the dark current pattern for a given temperature and exposure time, there must be no hysteresis with any of the two parameters.

Figure 1A:
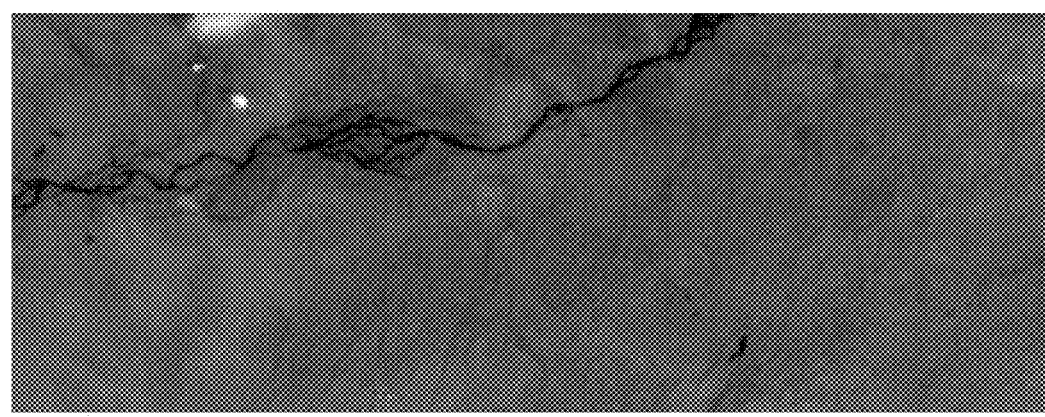
FIG. 1A-D.—Shows example images before and after subtracting the dark current pattern estimated by the proposed method.
Figure 1B:
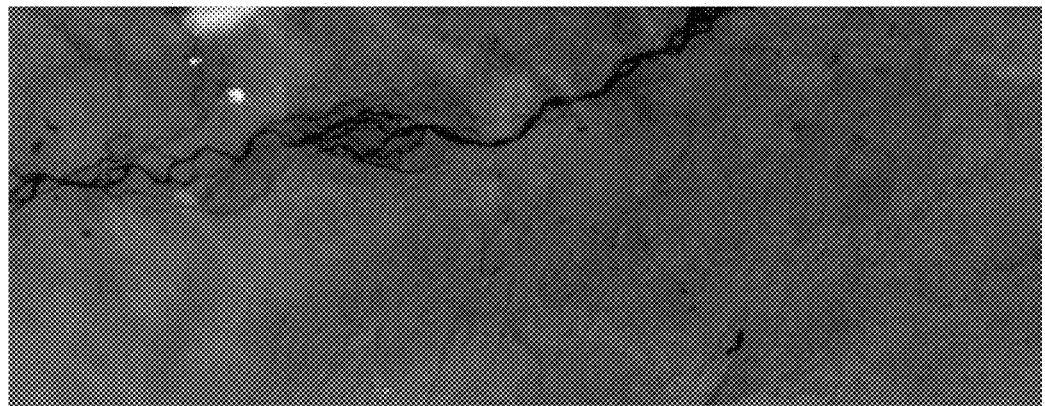
Figure 1C:
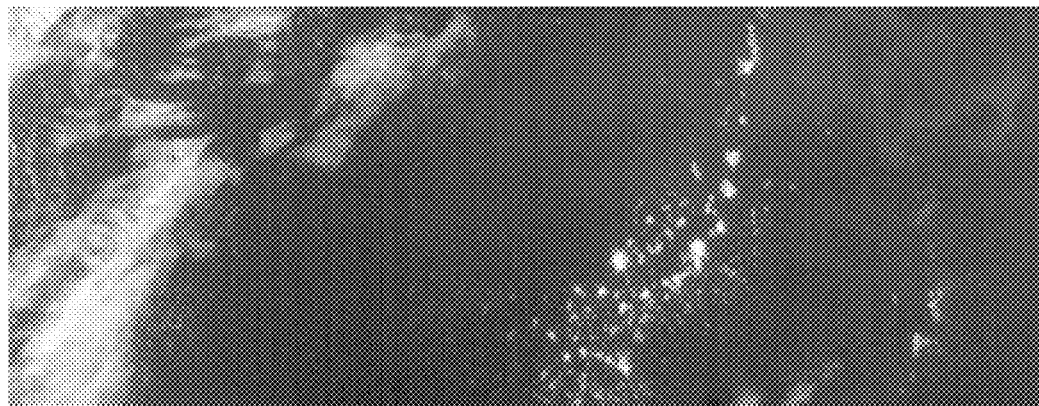
Figure 1D:
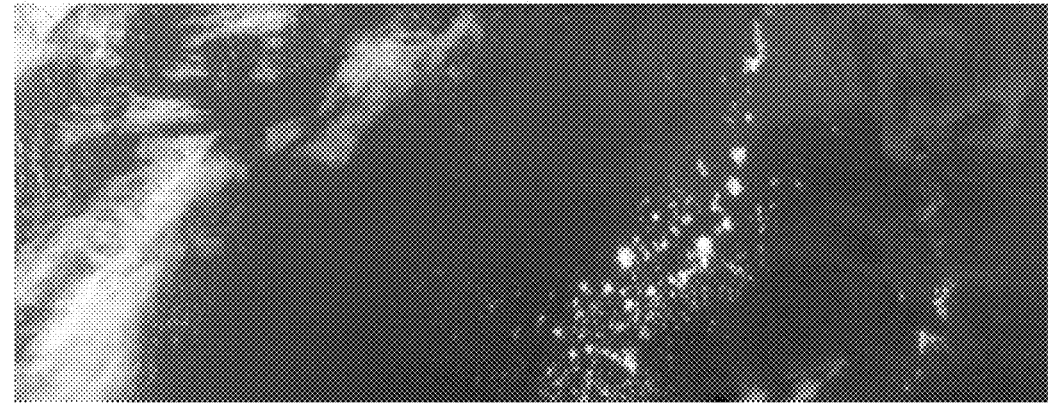
Figure 2:
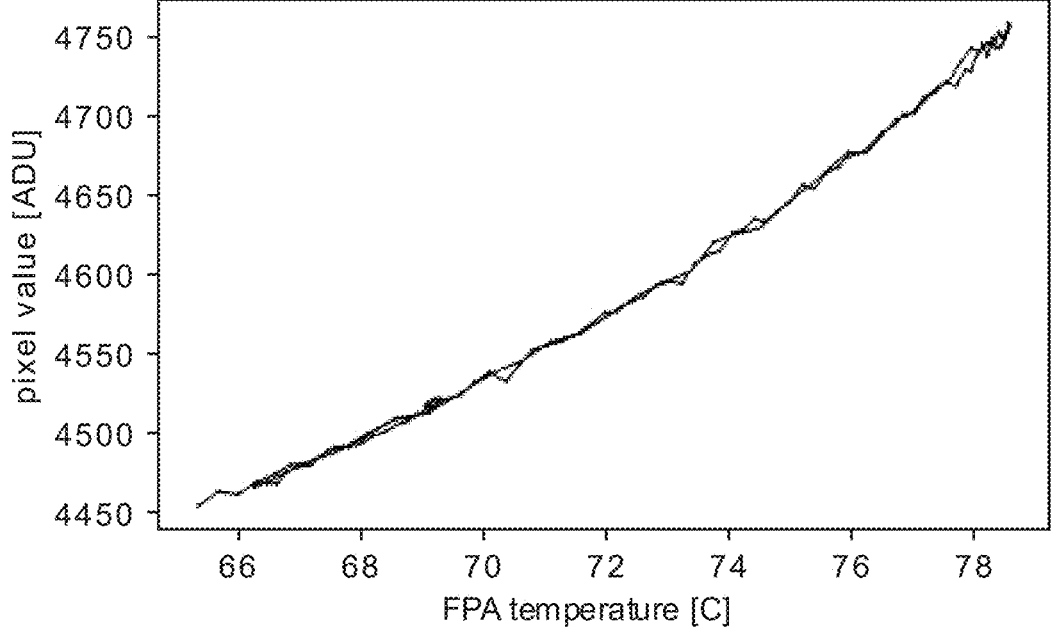
FIG. 2.—Shows the dark current measured in a single pixel during an increasing and decreasing temperature sweep.

A specific test was made in this sense, revealing that the measured dark current patterns are reproducible after rising and lowering $t_{exp}$ (just as expected) and temperature. The results of the temperature sweep are shown in FIG. 2.

The fact that no hysteresis was measured gives green light to developing a method for predicting the dark current pattern.

On the one hand, to better understand the global behaviour of the sensor, the median dark current rate (median of all pixels in the 2D array) was studied as a function of temperature. It was determined that the rate in (ADU/s) follows the Arrhenius equation, with an offset that can be attributed to the offset of the readout electronics:

$$median_{rate}(T) = Ae^{\frac{-E_a}{k_B \cdot T}} + C \tag{2}$$

where T is the FPA temperature (K), A is the pre-exponential factor (ADU/s), $E_a$ is the activation energy (eV), $k_B$ is the Boltzmann constant ($8 \cdot 617333 \cdot 10^{-5}$ eV/K) and C is the dark current rate offset (ADU).

Figure 3:
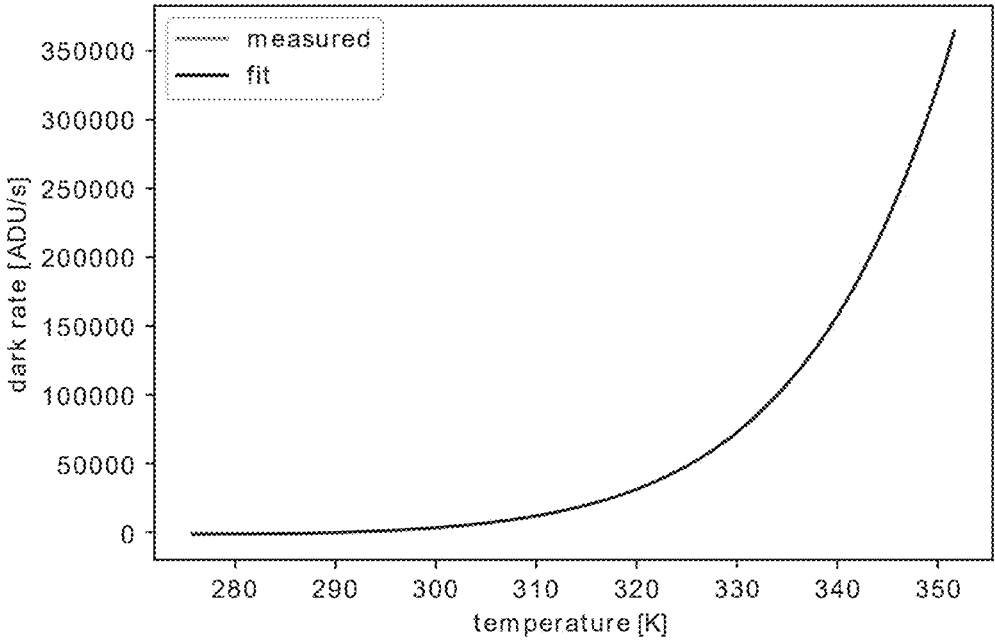
FIG. 3.—Shows median dark current rate.

This function was fitted for a temperature sweep with gain 0 and gain 1. The best fit was found with gain 0, where $R^2$>0.99999. The resulting parameters are listed in FIG. 10, while a plot of the dark current rate is shown in FIG. 3.

The most common InGaAs sensor composition for SWIR (Short Wave Infrared) imaging is In0.53Ga0.47As. The fundamental gap of this composition is 0.73 eV, which perfectly matches the measured value.

Figure 4:
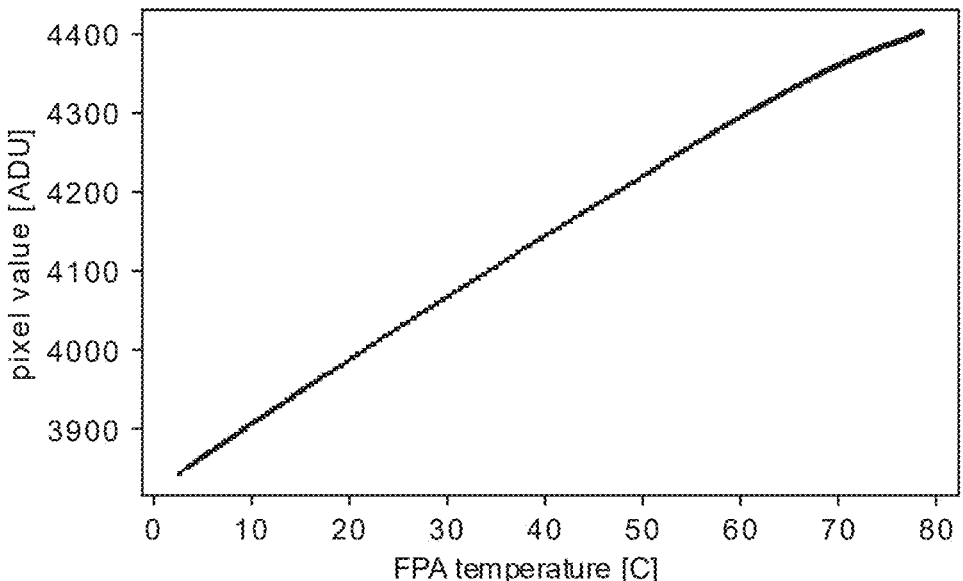
FIG. 4.—Shows median dark current offset.
Figure 5A:
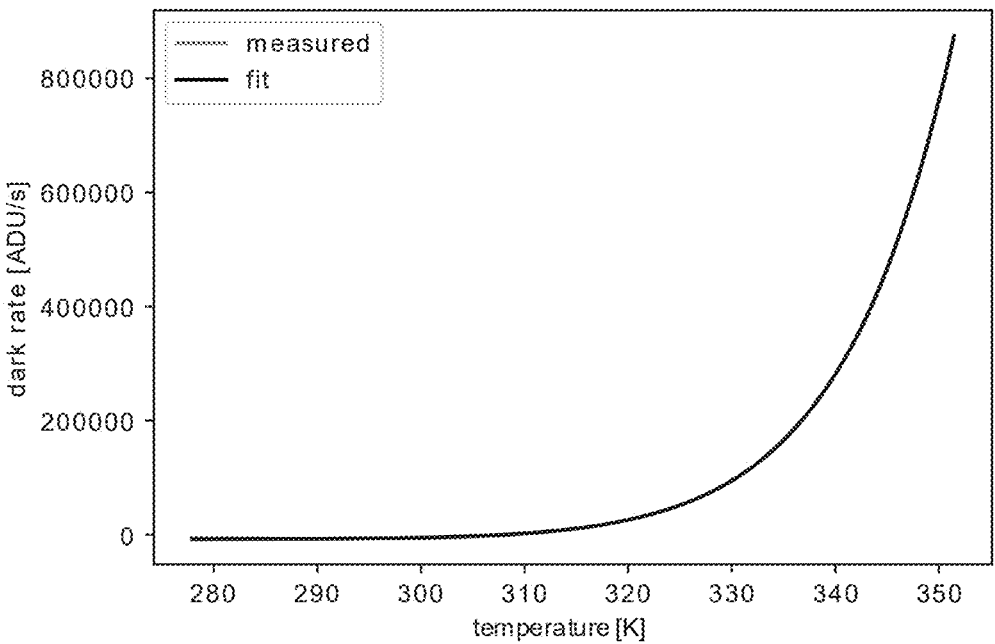
FIG. 5A-C.—Shows example pixels with different types of exponential fit for the dark current rate.
Figure 5B:
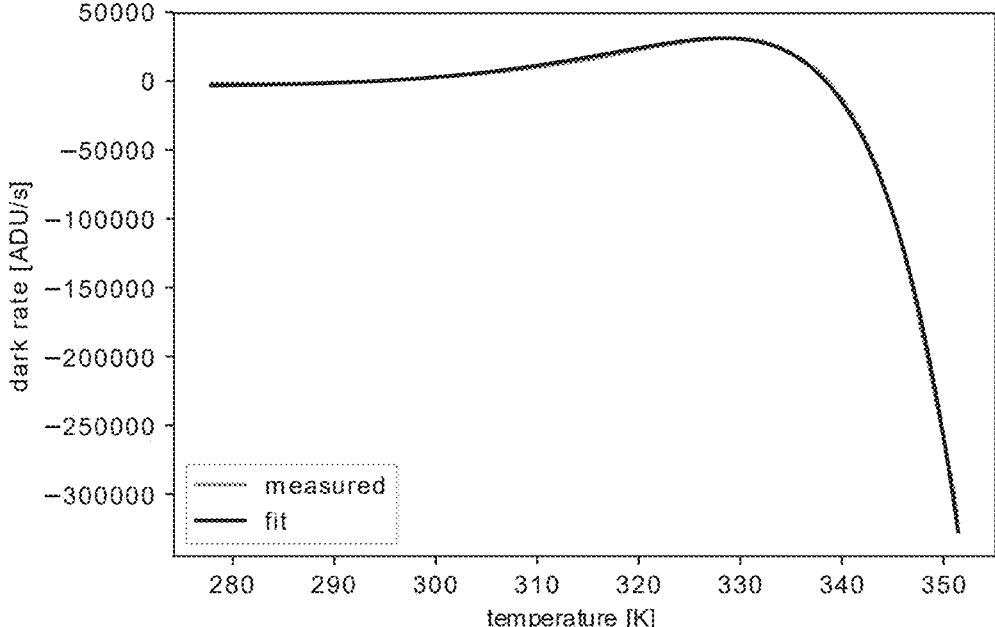
Figure 5C:
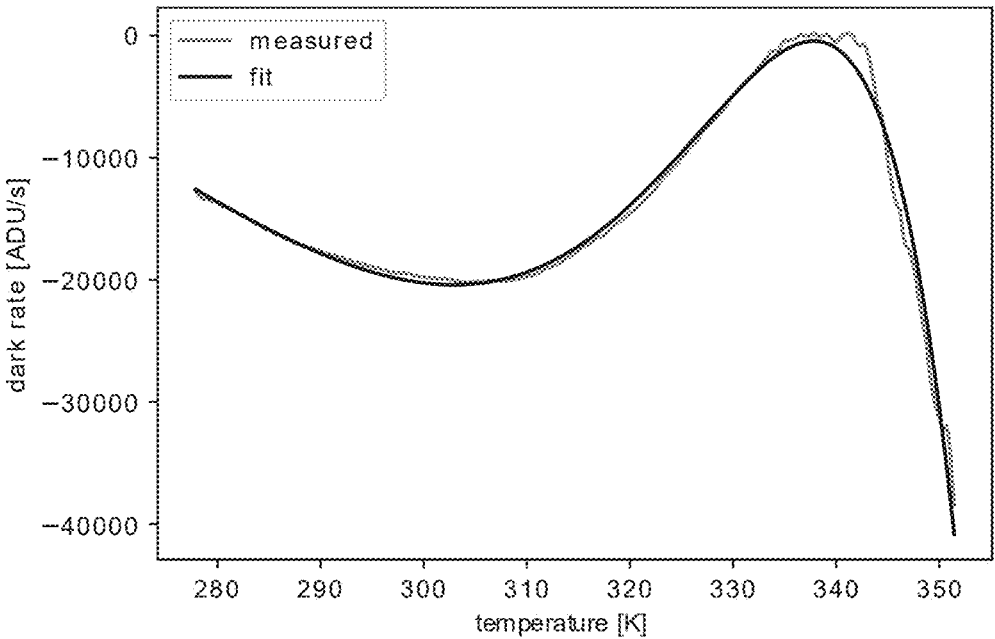

On the other hand, it was found that the median dark current offset depends on temperature almost linearly, with a soft decay as the temperature increases (see FIG. 4). It is not clear whether this decay is a result of some sort of saturation effect. The function that better models the dependency of the offset with the temperature is not clear either.

A closer analysis made pixel by pixel lead to the conclusion that many pixels do not follow the Arrhenius equation. Instead, they seem to follow a similar equation formed by the sum of up to three exponential terms:

$$rate = Ae^{-B/T} + Ce^{-D/T} + Ee^{-F/T} + G \tag{3}$$

where T is the temperature in Kelvin, and A-G are constants that define the shape of the curve. All the constants (and of course, the dark rate) depend on the pixel coordinate (x, y).

In equation (3), the first two terms may refer to diffusion and depletion dark current, respectively. It is not clear where the third term comes from, or whether it should actually have the same exponential form.

It was tested that not all the pixels need the three exponential terms for a good fit. Most of them only need one exponential, many of them two exponentials, and just a few of them are modelled with three exponentials. See FIG. 5, wherein example pixels with different types of exponential fit for the dark current rate are shown (FIG. 5A for single, FIG. 5B for double and FIG. 5C for triple).

A similar study was done for the offset, and it was determined that most pixels behave like the plot in FIG. 4. It was expected that the offset would change linearly with the temperature, but after the measurements it is not clear whether the best model consists on a sum of exponentials, a polynomial or a combination. A linear fit seems good enough for temperatures up to 60° C. though.

According to the results of the characterization, the total number of parameters required for fitting the dark current pattern would be 7 as a minimum (a biexponential fit for the dark rate and a linear fit for the dark offset). For a sensor with 640×512 pixels and single precision float values (32 bits), the fitted parameters would take 8.75 MBytes in memory.

On the one hand, fitting complex functions like the one that defines the dark current rate requires lots of manual tuning. For example, it is necessary to define a good starting point and step size that makes all pixels converge to the optimal solution. What is more, an algorithm that converges for a given data set may not converge for a different data set acquired with the same sensor due to small differences in such data.

On the other hand, it would not be a good practice to try to fit the dark current offset without knowing the actual equations that describe its dependence with temperature. Also, the equations that are valid for some sensors may not apply to others.

The problems stated in the paragraphs above suggest that an alternative, more robust way of estimating the dark current pattern would be beneficial. The proposal is not to try to fit dark current rate and offset versus temperature, but store a subset samples (e.g., take one sample every "step" samples) and get the desired values by means of spline interpolation.

Figure 16:
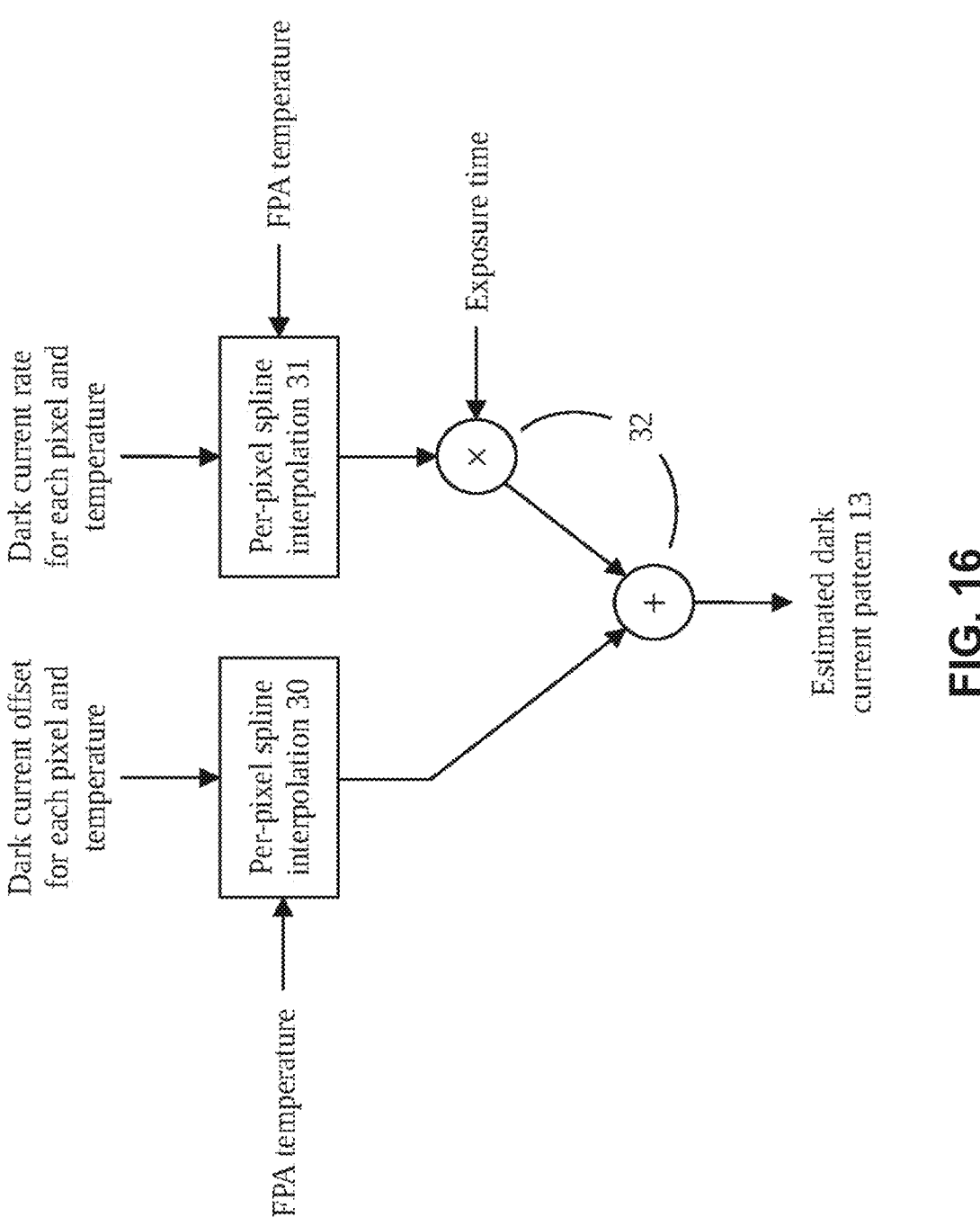
FIG. 16.—Shows the sub-steps of the dark current pattern definition step of the proposed method.

Therefore, as shown in FIG. 14, the present method comprises a second step (12) that consists on defining a pseudo-empiric model, based on the previously obtained images. As shown in FIG. 16, the second step (12) comprises a sub-step (30, 31) of obtaining the desired values (rate and offset of each pixel), using spline interpolation.

It was determined that the cubic interpolation method is surprisingly accurate for a few samples over the whole temperature range, as shown in FIG. 11. The data in this table was obtained from 200 temperature samples. In FIG. 11, disk usage is calculated as:

$$\frac{n\_params \cdot n\_pixels \cdot n\_bytes \cdot n\_samples}{step} \tag{4}$$

In these tests, n params=2 (dark current rate and offset), n pixels=640×512, n bytes=4 (single-precision floating point) and n samples=200 (one for each measured temperature).

The "error" columns refer to the absolute median difference between the measured and the estimated dark patterns.

The term "train" refers to a training image, that is, one that was used during the dark current fit (in these tests, 6 ms at 51.18° C.). On the other hand, "test" refers to a new reference image taken with a $t_{exp}$ that was not used during the training phase (in these tests, 2 ms at 45.88° C.). All the results in FIG. 11 were obtained with gain 0.

The amount of error depends mainly on the distance between the target temperature and the nearest temperature samples, as seen in FIG. 6 (6A shows median dark rate with step=10; 6B shows median dark offset with step=10; 6C shows median dark rate with step=20; 6D shows median dark offset with step=20; 6E shows median dark rate with step=40; 6F shows median dark offset with step=40).

Figure 6A:
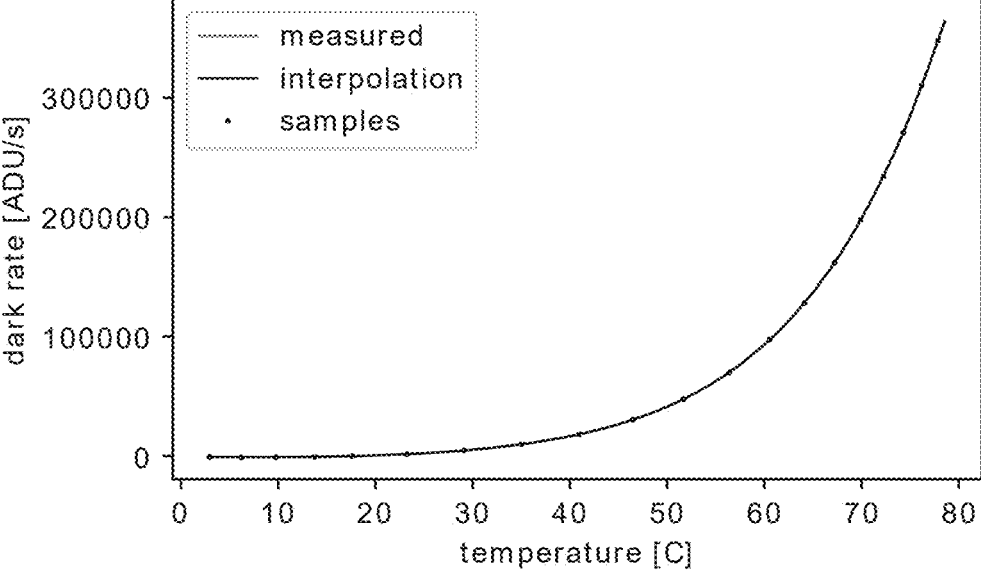
FIG. 6A-F.—Shows the measured and estimated dark current rates and offsets for various step sizes, using cubic interpolation.
Figure 6B:
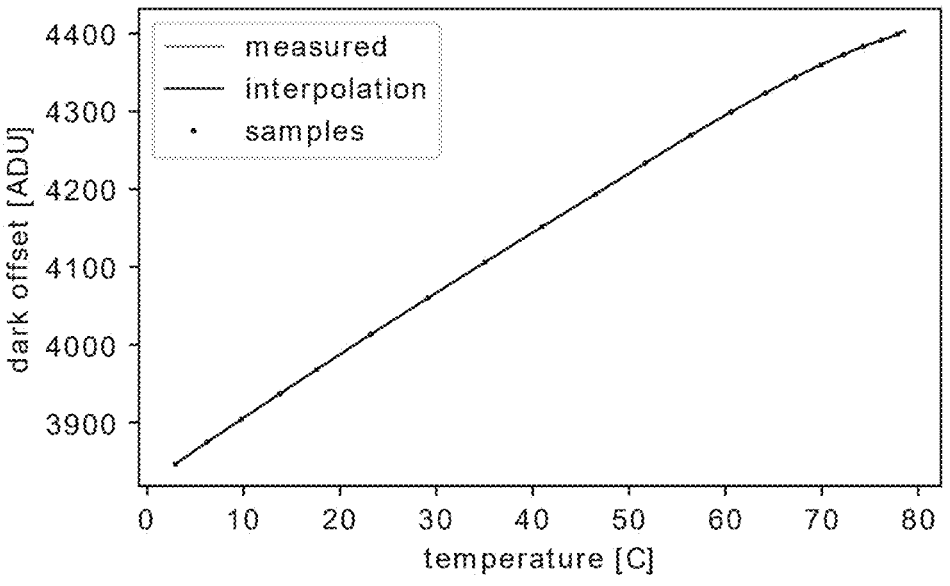
Figure 6C:
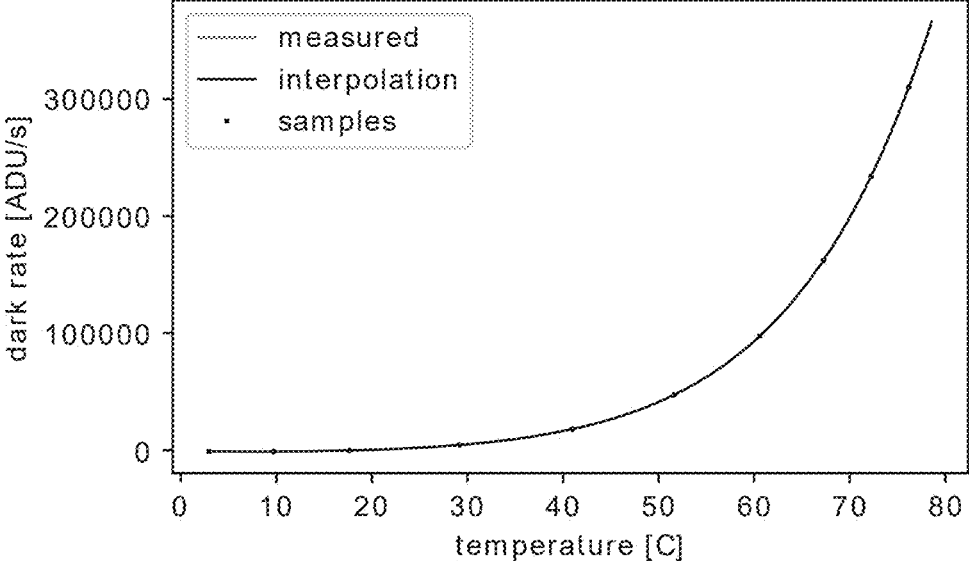
Figure 6D:
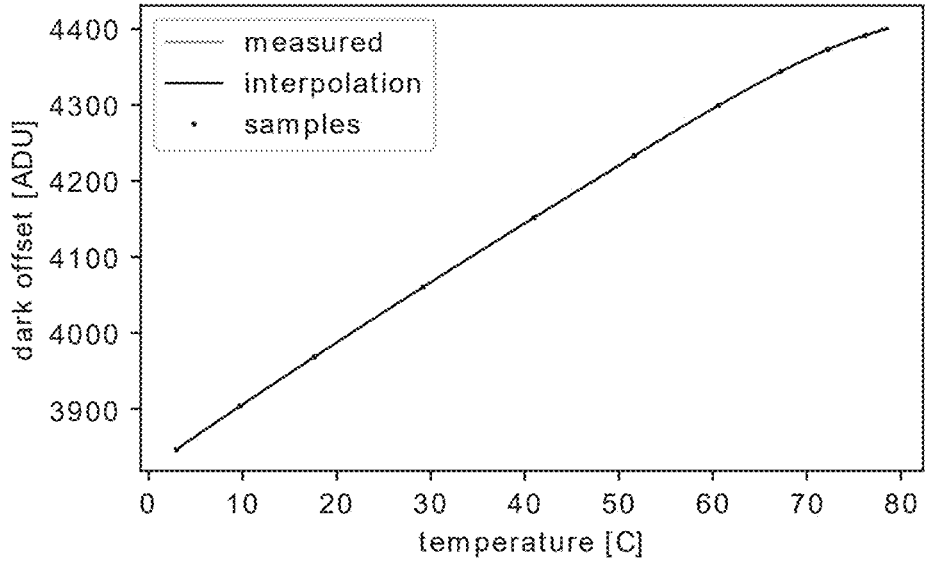
Figure 6E:
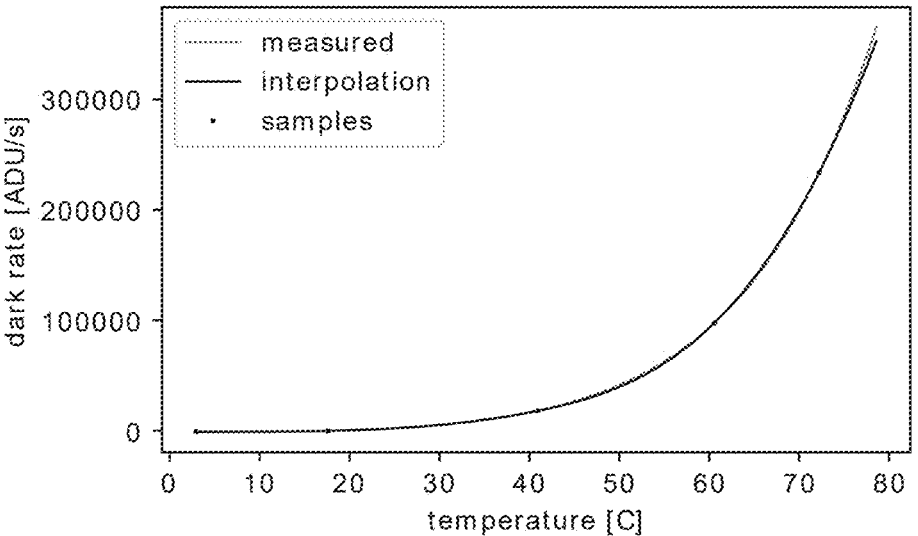
Figure 6F:
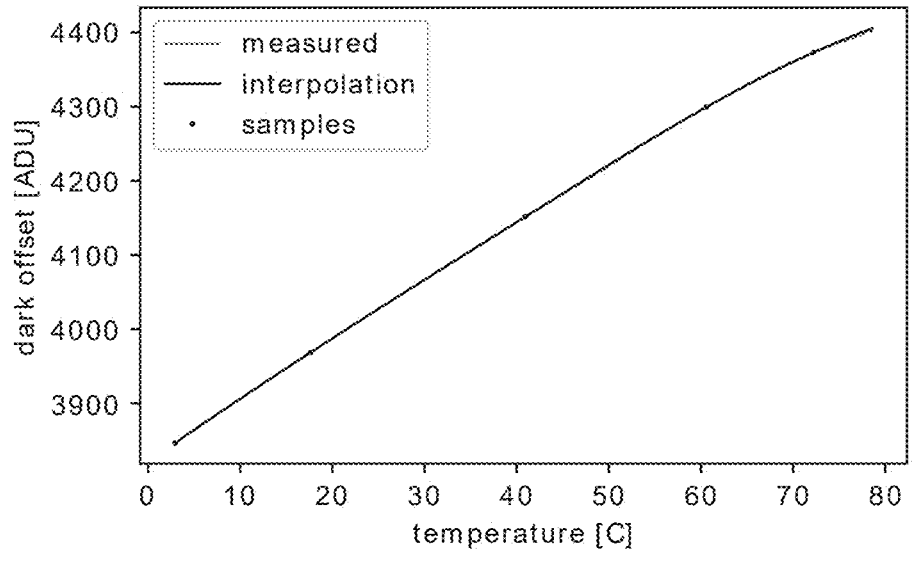

For example, the significantly higher error with the training image at step=40, shown in FIGS. 6E and 6F can be explained by the fact that 51.18° C. falls far away from the surrounding samples (40.78° C. and 60.48° C.). Of course, a smaller step reduces the probability of falling into such situation, but it has a computational and memory cost.

Figure 7:
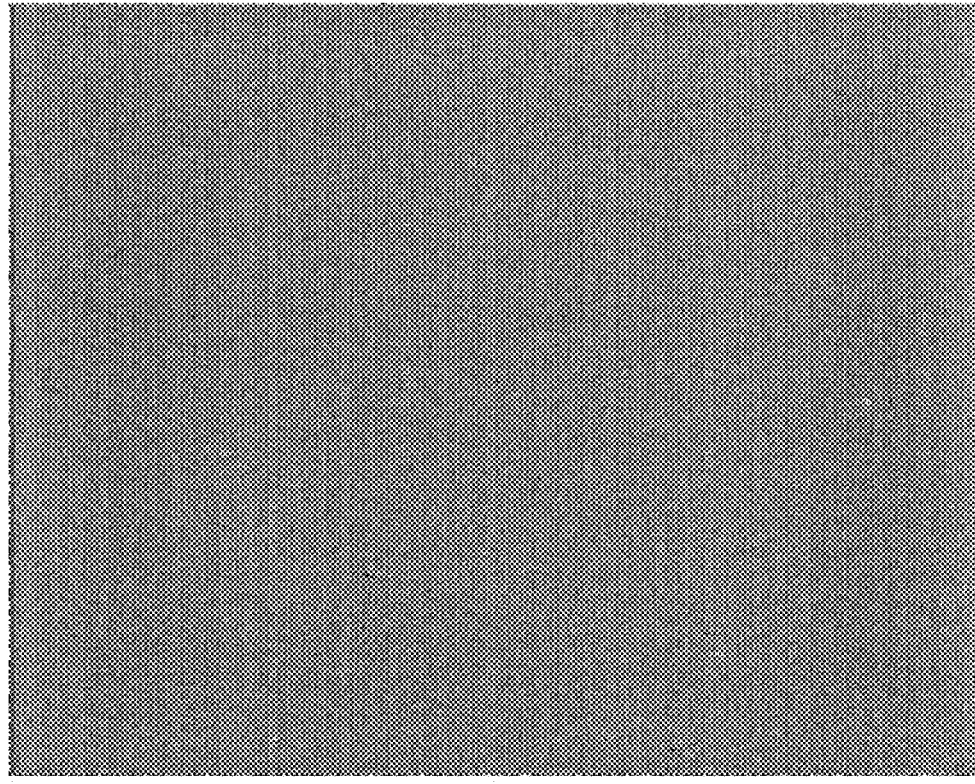
FIG. 7.—Shows the estimation error at 45.88° C. with step=20. The error image has been scaled so that black colour corresponds to −20 ADU and white colour to 20 ADU.
Figure 8A:
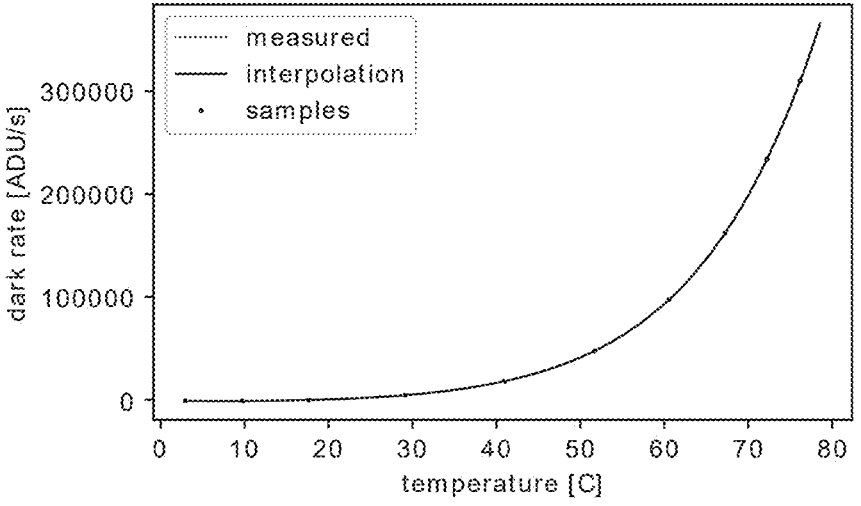
FIG. 8A-F.—Shows the measured and estimated dark current rates and offsets for interpolation types, using step=20.
Figure 8B:
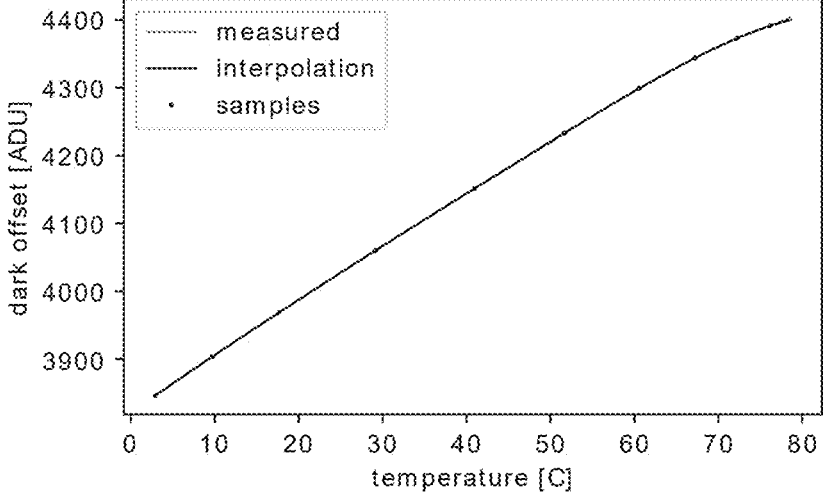
Figure 8C:
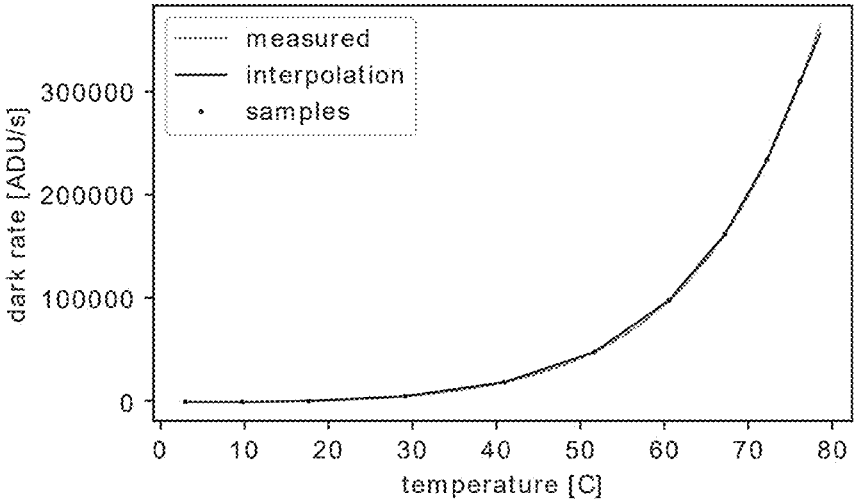
Figure 8D:
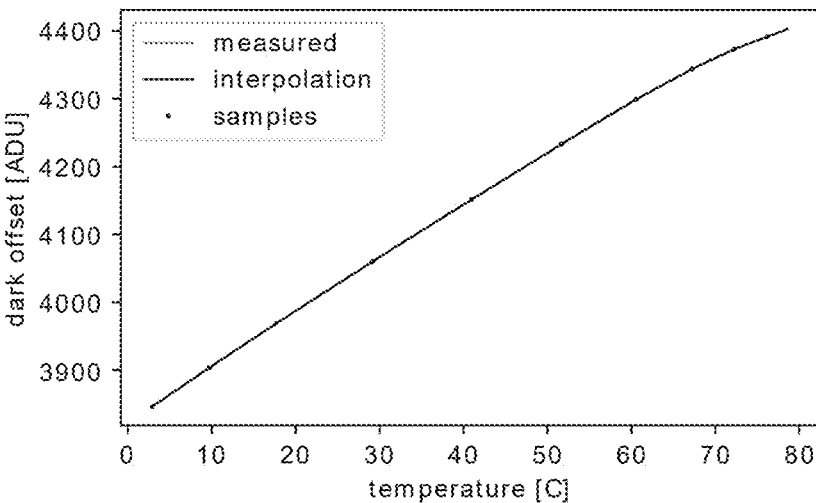
Figure 8E:
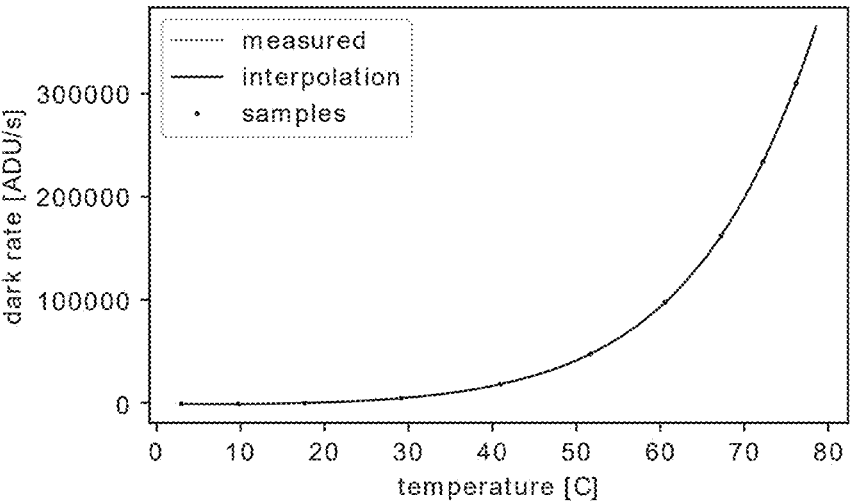
Figure 8F:
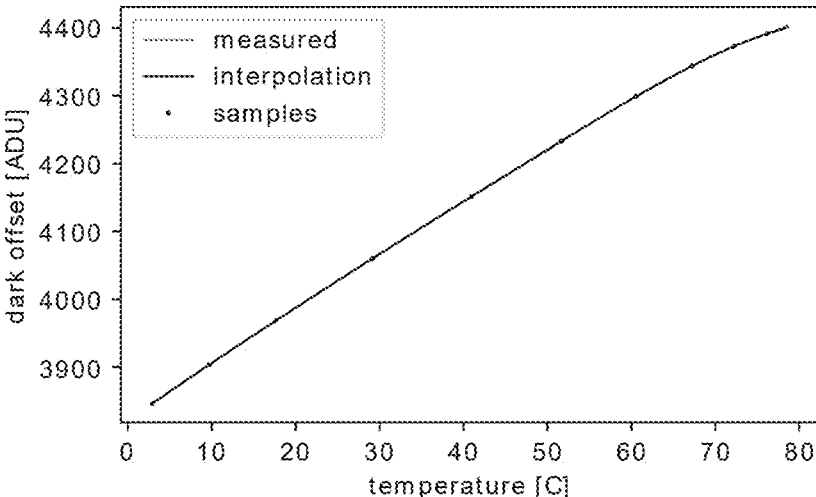

For the measurements under study, setting step=20 seems a good compromise for an embedded system. Indeed, 45.88° C. falls far away from the surrounding samples at step=20 (40.96° C. and 51.16° C.), but this did not produce a significant error in the estimated image, as shown in FIG. 11 and FIG. 7. For a regular computer, step=10 might be a better option.

In any case, the estimation errors are always below the readout noise itself (around 16.8 ADU, as measured in other tests with this sensor). If one takes into account the dark noise as well, the estimation errors are even less significant.

The estimation of dark current rate and offset was with three different methods: linear, quadratic and cubic (1st, 2nd and 3rd order) interpolation with natural boundary conditions.

The objective is to find the simplest method that offers good results. The measured estimation errors with the test configuration (2 ms at 45.8° C., step=20) are listed in FIG. 12. The resulting plots are shown in FIG. 8 (8A median dark rate with linear interpolation; 8B median dark offset with linear interpolation; 8C median dark rate with quadratic interpolation; 8D median dark offset with quadratic interpolation; 8E median dark rate with cubic interpolation; 8F median dark offset with cubic interpolation).

It can be seen that the error with linear interpolation is significantly higher than the rest of methods. This behaviour was expected due to the exponential shape of the curves and the selected FPA temperature falls in the middle of two reference temperature samples. On the other hand, the cubic method is considerably more complex to implement and calculate, but the error does not become not significantly lower.

According to the obtained results, the quadratic method would be a good compromise for an embedded system. For a regular computer, the cubic method might be preferable.

For some relatively hot pixels, it may happen that saturation is reached for high temperatures. If this situation is ignored during the dark pattern fit, the dark rates and offsets will be estimated incorrectly for those temperatures.

For example, a very hot pixel might result in a reduced or null rate and an offset close the pixel full well or the upper limit of the ADC (whichever comes first). Even if the dark rates and offsets are measured incorrectly in hot pixels, in most cases the estimated patterns will be correct, and the hot pixels will have a high value as expected.

The hot pixels are usually removed in further postprocessing steps, so estimation errors in these pixels are not important. The values of the pixels near saturation could be extrapolated to emulate the absence saturation effects. However, due to the noise at high temperatures and the difficulty to fit the pixels to a known equation, this method was not determined to be robust and was discarded.

The present invention describes a method to estimate the dark current pattern of an uncooled InGaAs sensor, based on measurements performed beforehand in laboratory. The obtained results show that this method is highly accurate (error is much lower than readout noise), for a wide range of exposure times and temperatures.

As an example of the above, FIG. 1 shows example images before (FIGS. 1A and 1C) and after (FIGS. 1B and 1D) subtracting the dark current pattern estimated by the proposed method. The images were taken from orbit with an InGaAs sensor on board a small satellite, with no active temperature control and no mechanical shutter available.

The invention claimed is:

1. A dark current pattern estimation method comprising the steps of:

providing a 2D sensor for a shutterless uncooled camera, comprising a matrix of pixels, characterizing each pixel independently as a function of a Focal Plane Array temperature and an exposure time value, which comprises the sub-steps of:

setting a new Focal Plane Array temperature, waiting for the new Focal Plane Array temperature to stabilize, acquiring, by using the camera, averaged images at two or more exposure time values for each new Focal Plane Array temperature, obtaining from each averaged image a dark current offset and a dark current rate, measured in Analog to Digital Units, for each pixel by a linear adjustment, repeating all the previous steps until a predetermined number of averaged images has been acquired, defining a dark current pattern for the 2D sensor, which comprises the sub-steps of:

spline interpolating the dark current offsets obtained for each pixel as:

$$\text{offset}(T,x,y)$$

spline interpolating the dark current rate obtained for each pixel, as $$\text{rate}(T,x,y)$$

and obtaining the dark current pattern for each pixel following equation:

$$\text{pattern}(T,x,y)=\text{rate}(T,x,y)\cdot t_{exp}+\text{offset}(T,x,y)$$

where T is the Focal Plane Array temperature, in Kelvin, and (x, y) are pixel coordinates.

2. The method of claim 1, wherein the steps of setting a new Focal Plane Array temperature and waiting for the new Focal Plane Array temperature to stabilize follows an ascending or a descending temperature ramp.

3. The method of claim 1, wherein the exposure time values are in a linear zone of the 2D sensor.

4. The method of claim 1, wherein the exposure time values are short enough to minimize the variation of temperature during the step of acquiring averaged images for each new Focal Plane Array temperature.

5. The method of claim 1, wherein spline interpolation can be selected between linear, quadratic and cubic interpolation.

\* \* \* \* \*